April 23, 1935. W. D. BELL 1,998,700
CONTINUOUS BLOW DOWN DEVICE
Filed Nov. 3, 1933 2 Sheets-Sheet 1

INVENTOR
W. D. Bell
BY
Johnston & Jennings
ATTORNEYS

April 23, 1935.  W. D. BELL  1,998,700

CONTINUOUS BLOW DOWN DEVICE

Filed Nov. 3, 1933   2 Sheets-Sheet 2

INVENTOR

W. D. Bell

BY

Johnston & Jennings

ATTORNEYS

Patented Apr. 23, 1935

1,998,700

UNITED STATES PATENT OFFICE 1,998,700

CONTINUOUS BLOW DOWN DEVICE

William D. Bell, Birmingham, Ala.

Application November 3, 1933, Serial No. 696,498

5 Claims. (Cl. 122—382)

My invention relates to a continuous blow down device for locomotive boilers, and has for its object the provision of a simple device of the character designated which may be readily adapted to existing types of blow down valves; which shall be inexpensive and easy of application, and which shall be effective to reduce the quantity of solids in suspension in the boiler during operation.

A further object of my invention is to provide a continuous blow down device for locomotive boilers which shall be adapted to be used in combination with standard designs of blow out cocks and ash pan clean out devices, and which shall include a means for intermittent blow down, a continuous restricted blow down, or a full open blow down of the boiler.

A more specific object of my invention is to provide in the blow out cock for a locomotive boiler, an interchangeable restricted orifice plug adapted to provide a continuous blow down for the boiler, and which in operation shall be self cleaning so as not to become obstructed by scale and foreign matter.

The advantages of a continuous blow down for locomotive boilers, as well as for stationary boilers, are now well recognized. Where a continuous restricted blow down is provided at a point where solids in suspension are ordinarily concentrated in the boiler, a restricted continuous blow down provides a means whereby these solids are continuously removed from the boiler, and an undue accumulation of solids in the boiler is thus prevented.

In applying such devices to locomotives, difficulties have been encountered in condensing the steam vaporized upon discharging the water and sludge to the atmosphere so that they would not obstruct the vision of the enginemen. It is well known that any escaping steam which obstructs the vision of the enginemen is not only highly objectionable in operation, but is contrary to law. Furthermore, difficulties have been encountered in maintaining such devices free of sludge and scale so as to maintain a continuous blow down.

In accordance with my invention, I provide a continuous blow down means in a standard blow down device, and locate the blow down device at a point in the water leg of the boiler at a point remote from its final discharge, and connect the blow down device by a system of piping running outside the boiler of sufficient length to provide an air cooled condenser which condenses the steam vaporized from the hot water discharged into the piping. The condensed vapor and water from the boiler are discharged into the ash pan in a continuous trickle of water without any objectionable cloud of steam. The water discharged into the ash pan serves the useful purpose of quenching any fire which may fall through the grates and thus prevents heating of the pan and the formation of clinkers therein.

Furthermore, when it is desired to clean the ash pan, the blow off device may be opened wide which serves the double purpose of cleaning the ash pan and cleaning off the surface of the restricted continuous blow down device which I provide.

Apparatus embodying features of my invention is illustrated in the accompanying drawings forming a part of this application, in which Fig. 1 is a fragmentary plan view of a locomotive boiler having my improved blow down device attached thereto;

Figure 1:
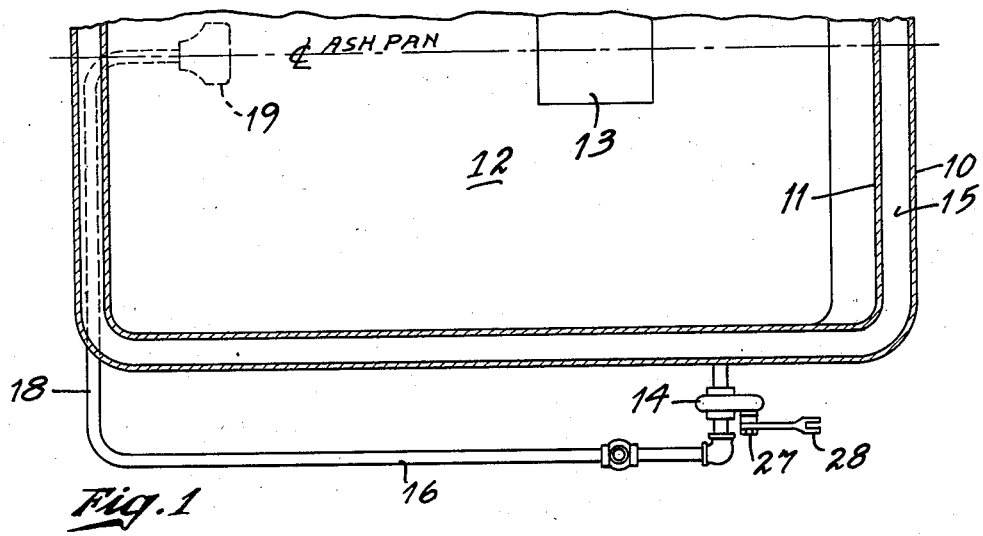
Figure 2:
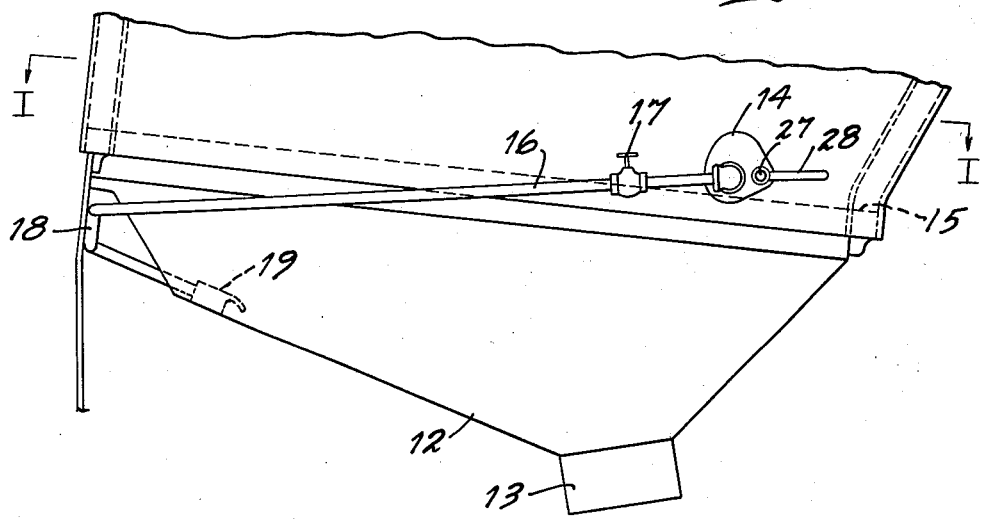
Fig. 2 is a side elevation of the same.

Referring now to the drawings for a better understanding of my invention, I show in Figs. 1 and 2 the lower water leg of a locomotive boiler comprising outside sheets 10 and inner fire box sheets 11 which are joined at their lower edges to an iron mud ring 15. These sheets, as is well understood, form the boundaries of the locomotive fire box. Disposed beneath the fire box is the usual ash pan 12 having a clean out opening 13 therein.

As is well known, solids in suspension in boiler water settle to the lowest part of the boiler, and for that reason I connect a blow off cock 14 to the side of the water leg of the boiler at one end of the fire box, immediately above the mud ring 15. Connected to the blow off cock 14 is a discharge pipe 16 which has disposed therein a globe valve 17 which permits the blow down to be shut off entirely. The discharge pipe 16 continues to the other end of the fire box, and a lateral branch 18 leads across the end of the ash pan to the center thereof where it is connected to a well known form of clean out nozzle 19, disposed so that when desired the contents of the ash pan may be cleaned by opening wide the blow out device 14 and blowing the contents of the ash pan out through the clean out opening 13.

Figure 3:
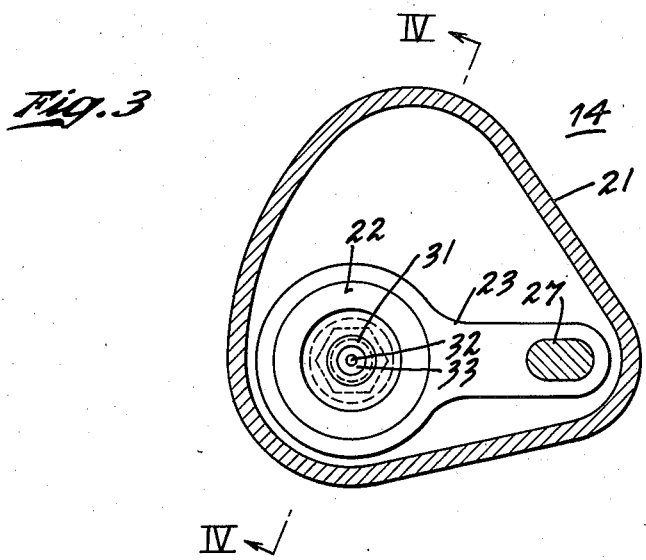
Fig. 3 is a sectional view of a blow down valve having my improved restricted orifice plug provided therein.
Figure 4:
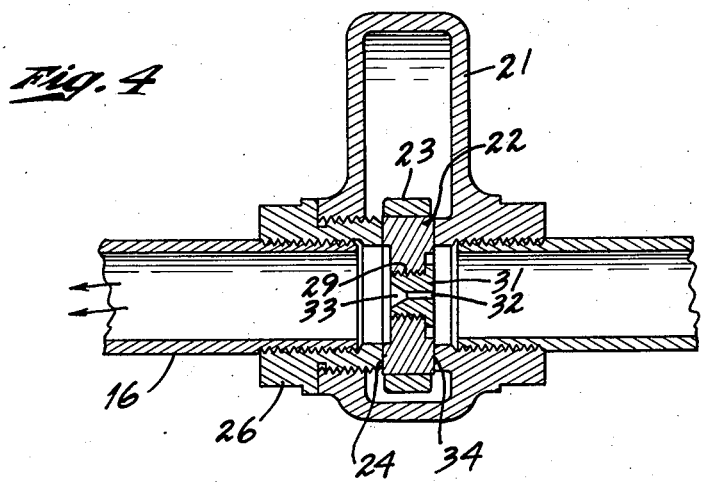
Fig. 4 is a sectional view taken along the line IV—IV of Fig. 3.

Referring now to Figs. 3 and 4, I will describe the means by which I provide a continuous blow down. The blow off cock 14 illustrated in detail in Figs. 3 and 4, is a well known rotary gate type of valve, but it is to be understood that my invention is equally applicable to other types of gate valve construction. The valve here illustrated comprises a casing 21 having located therein a valve body 22 carried by a yoke 23 and seating against a seat 24 provided upon a removable bushing 26 which screws into a casing 21. The yoke 23 is mounted on a rotary spindle 27 which extends without the casing and has connected thereto an operating arm 28 (see Fig. 1).

In the valve body 22, I provide a threaded central opening 29 and into this opening I screw a plug 31 having provided therein a restricted orifice 32 extending longitudinally through the plug to discharge directly into the discharge conduit 16. The outer or discharge end of the orifice 32 is countersunk to provide a flaring opening 33, thus providing a nozzle for the discharge which aids in immediately vaporizing the heated water and in keeping the restricted orifice clean. The inner surface of the restricted orifice plug 31, or the surface against which the boiler pressure acts, is made flush with the inner surface of the valve body 22. The casing 21 is provided with an inner flange 34 against which the valve body 22 snugly fits when in operating position, so that as the valve body is swung to wide open position the inner face of the valve body and the orifice plug 31 are wiped off, removing any accumulated scale which might act to obstruct the orifice 32.

The orifice plug 31 may be made of any suitable material, but preferably it should be of some tough material, such as cold rolled brass, or equivalent tough, non-corrosive substance capable of resisting the abrasive action of the solids being expelled continuously therethrough, and capable of resisting the corrosive action of boiler water. The size of the orifice 32 may also vary in accordance with the local conditions under which the device is to be used. Obviously, the greater the amount of solids in suspension in the particular boiler water, the larger the size of the orifice 32. I have found that orifices of from one-sixteenth to three-sixteenths of an inch in diameter will serve to greatly minimize the accumulation of solids in most boiler water.

From the foregoing description, the operation of my improved apparatus will be obvious. Under ordinary conditions, globe valve 17 is left open and there is a continuous discharge of water and accumulated solids through the orifice 32 into the discharge pipe 16. The discharge pipe 16 is of such length that it serves to cool and condense the steam vaporized from the discharged water as it leaves the orifice 32, so that it is discharged through the ash pan clean out device 19, in the form of water. Any steam which might be uncondensed in its travel through the pipe 16 is carried by the draft from the ash pan 12 up through the fire box of the locomotive.

Whenever it is desired to have a more complete blow down, or to clean the ash pan 12, the operating handle 28 is turned to open the blow off cock 14 wide, at which time a large quantity of water and steam under pressure is discharged into the pan 12 momentarily. When water conditions are such that a continuous blow down is not needed, or when the locomotive is standing by under steam and not working, the globe valve 17 may be closed off entirely, thus avoiding a waste of water.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:

1. In a continuous blow down device for a locomotive boiler, a blow off cock embodying a gate valve member having a restricted orifice therethrough permitting a continuous restricted blow down and connected directly to the side of the boiler below the water line thereof, and a conduit connected to the blowoff cock and having sufficient length exposed to the atmosphere to form an air cooled condenser to condense substantially all the steam vaporized therein from the water passing through the restricted orifice before discharging it.

2. In a continuous blow down device for a locomotive boiler having an ash pan, a blow off cock connected to the boiler below the water line, a gate valve member in the blow off cock, a plug having a restricted orifice therein and extending through the gate valve member, said plug being positioned so as to permit a continuous restricted blow down through said restricted orifice when the valve is in closed position, and a conduit leading from the blow off cock to the ash pan, said conduit having sufficient length exposed to the atmosphere to cool and condense substantially all of the steam vaporized therein from the hot water passing the restricted orifice before it reaches the ash pan.

3. In a continuous blow down device for locomotive boilers, a valve body connected to the boiler below the water line thereof, a gate valve member in the valve body, a plug threaded into the gate valve member and extending from the pressure to the discharge side thereof and having a restricted orifice extending therethrough, said orifice terminating on the discharge side of the gate valve member in a flaring opening, said plug being positioned flush with the surface of the pressure side of the gate valve member, means for moving the gate valve member to wide open position, means in the valve body to clean accumulated solids off the pressure side of the gate valve member as it is moved to wide open position, and a discharge conduit connected to the gate valve and exposed to the outside air, said conduit being of sufficient length to form an air cooled condenser and condense substantially all the steam vaporized from the water passing through the restricted orifice before discharging it.

4. In a continuous blow down device for a locomotive boiler, a valve disposed below the water line of the boiler and having a restricted orifice therein to permit a continuous restricted discharge of hot water from the boiler, and a conduit connected to the valve and having sufficient length exposed to the atmosphere to condense substantially all the steam vaporized from the water passing through the restricted orifice before discharging it to the atmosphere.

5. In a continuous blow down device for a locomotive boiler, a valve disposed below the water line of the boiler and having a restricted orifice therein to permit a continuous restricted discharge of hot water from the boiler, a conduit connected to the valve and having sufficient length exposed to the atmosphere to condense substantially all the steam vaporized from the water passing through the restricted orifice before discharging it to the atmosphere, an ash pan, and a nozzle in the ash pan connected to the discharge end of the conduit.

WILLIAM D. BELL.